(12) United States Patent
Hertz et al.

(10) Patent No.: US 6,514,549 B1
(45) Date of Patent: Feb. 4, 2003

(54) COLOR-ALTERING FOOD PRODUCT

(75) Inventors: George H. Hertz, Troy, IL (US); David B. Gerfen, New Athens, IL (US)

(73) Assignee: Custom Industries U.S.A., Inc, St. Louis, MO (US)

( * ) Notice: Subject to any disclaimer, the term of this patent is extended or adjusted under 35 U.S.C. 154(b) by 359 days.

(21) Appl. No.: 09/604,368

(22) Filed: Jun. 27, 2000

(51) Int. Cl.[7] ................................................. A23L 1/27
(52) U.S. Cl. ........................ 426/249; 426/250; 426/268
(58) Field of Search ................................ 426/250, 262, 426/268, 98, 249

(56) References Cited

U.S. PATENT DOCUMENTS

| | | | | |
|---|---|---|---|---|
| 4,104,405 A | * | 8/1978 | Forkner | 426/94 |
| 4,853,235 A | | 8/1989 | Tomomatsu | 426/93 |
| 5,021,252 A | * | 6/1991 | Huang et al. | 426/412 |
| 5,049,399 A | * | 9/1991 | Huang et al. | 426/87 |
| 6,180,158 B1 | * | 1/2001 | Zietlow et al. | 426/571 |
| 6,207,216 B1 | * | 3/2001 | Zietlow et al. | 426/564 |
| 6,419,902 B1 | * | 7/2002 | Wright | 424/94 |

\* cited by examiner

*Primary Examiner*—Nina Bhat
(74) *Attorney, Agent, or Firm*—Gregory Upchurch; Ahaji Kirk Amos; Thompson Coburn, LLP

(57) ABSTRACT

Color altering food products and methods which utilize a plurality of coloring factors containing dyes and/or lakes in combination with various substrates. Coloring factors with varying degrees of responsiveness to moisture are combined to provide selectively varying color altering effects in either the product, a food substance which contains moisture that the product contacts, or in a consumer's mouth. These effect may also be controlled to occur in varying combinations as well as with varying delays in onset. Additional control of aspects of the color altering effect's activation following exposure to elevated temperatures is provided.

61 Claims, No Drawings

COLOR-ALTERING FOOD PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the marketing of food substances appearance has become an increasingly important factor. Coloring has been employed historically to provide a food substance color appearance that coincides with consumer expectations. More recently, food coloring has been used less conventionally to produce unnatural or surprising food appearances. Providing visual entertainment is increasingly becoming a critically important aspect of a food's commercial success, particularly in the novelty and children's food segments.

Manipulations of a food's visual appearance currently include ingredients that change a food's color when used. There are products such as chocolate and strawberry powders or colored sugars which change the color of an aqueous solution, such as milk, to the same color as the powder or sugar. These products are employed in a variety of applications, from coloring yogurt to a candy which stains the mouth. However, a product which presents one color and induces a color change in a food substance to a second color while still continuing to present the first color would provide additional visual attractions which were not previously possible. Food products providing further variations in color changing effects are also desirable.

SUMMARY OF THE INVENTION

The present invention described herein is a separate product for utilization in a variety of foods. In accordance with the present invention these foods' appearances are initially determined by their individual natures. The color altering effects of the present invention operate upon these foods' initial appearance to both alter the foods' appearance and to provide a color-altering effect to moisture containing foods the product contacts.

An object of the present invention is to provide a food product which presents an appearance of one color while inducing a contribution of a second color to a moisture containing food substance the product contacts.

A second object of the present invention is to provide a food product which initially presents an appearance of a first color and, upon contact with a food substance containing moisture, contributes the first color to the appearance of the food substance while the product's appearance changes to a second color.

A third object of the present invention is to provide a food product which presents a plurality of colors in its appearance and, after contacting a moisture containing food substance, either alters the food substance's appearance by contributing a plurality of colors, alters its own appearance by changing the plurality of colors it presents or both.

A fourth object of the present invention is to provide a food product in accordance with any of the first three objects where the color altering process is controlled to progress at a selectively determinable rate upon contact with moisture, and wherein the rate of color alteration may differ for different colors.

A fifth object of the present invention is to provide a food product in accordance with any of the first three objects where the response to moisture color altering effect of the food product is controlled to occur only following exposure of the product to a temperature exceeding a selected temperature.

A sixth object of the present invention is to provide a food product which upon contact with moisture in a consumer's mouth effects color alterations of multiple intermixing colors so that during the consumption of the product, the consumer's mouth is colored in varying manners.

DETAILED DESCRIPTION OF THE PREFERRED EMBODIMENTS

It should be understood that the naming of a particular color in the description of the present invention is purely for illustrative purposes. It is well known in the art that dyes and lakes of any color in the spectrum are readily available both as individual components and by combination of dyes and lakes of the primary and secondary colors, and the scope of the present invention is envisioned as encompassing the use of any color or combination of colors possible.

In addition to coloring factors, which may be dyes or lakes and dyes, the product will generally include a substrate with which the coloring factors are combined. The substrates employed include, but are not limited to:

SUGARS—such as Sucrose in various grinds, powdered, granulated, coarse, or sanding; Dextrose; Fructose; "Pearl" or Colored Sugars.

SUGAR REPLACEMENTS—Polyols such as Sorbitol, Manitol, and Xanitol.

MALTO-DEXTRINS—with Dextrose Equivalents (DE) between 5 and 20.

FLOURS—such as Wheat, Corn, Soy, and Rice.

STARCHES—such as Corn, Wheat, and Tapioca.

DAIRY PRODUCTS—such as Non-Fat Dry Milk Powder (NFDM), Yogurt, Powdered Milk, and Dry Creamer.

CORN SYRUP SOLIDS—approximately intermediate of Dextrose and Malto-Dextrines with a DE in the general vicinity of 36–42.

PARTICLES—such as products sold under the trade designation "Custom Bits", "Gems", "Sprinkles", "Shapes", and "Non-Parells" by Custom Industries.

DEHYDRATED FRUIT PIECES & POWDERS.

CEREAL PRODUCTS.

The variety of food contexts in which the present invention can be utilized is innumerable. The primary embodiments are anticipated for use in five general categories of application. Within these categories are various examples illustrating specific instances of the present invention's preparation, composition, and employment. The following includes references to coloring products sold under the trade designations: "WJ color blend" and a number; the number indicating an individual color blend product of specific dyes and/or lakes of specific colors sold by Warner Jenkinson of St. Louis, Mo. A lake is a coloring factor well known in the art comprised of a dye on an aluminum substrate and characterized by a color intensity approximately ¼ that of a similar amount of dye and by an enhanced ability to mask an underlying layer in comparison to a dye. An important aspect of the functionality of the present invention results from the differential employment of dyes, which respond to contact with moisture by providing a coloring effect, in contrast to the employment of lakes and lipid encapsulated dyes which do not respond to moisture by providing a coloring effect.

Application #1 Dairy (Particularly Yogurt & Milkshakes)

The WJ Color Blends are plated (Mixed) on various substrates such as sugar, NFDM, yogurt powder, dextrose or particulates, though almost any substrate could be used. Flavors as well as anti-dusting agents are optionally added. The color lake/dye blend can be used from 0.01 to 10%, anti-dusting from 0 to 2%. Representative examples are:

EXAMPLE #1

| | |
|---|---|
| Sanding Sugar | 500 grams |
| WJ Color Blend CLS 27513 | 1.5 grams |

Following combination, the sugar is red. When a small amount is stirred into yogurt, the yogurt turns green.

EXAMPLE #2

| | |
|---|---|
| NFDM | 500 Grams |
| WJ Color Blend CLS 27511 | 1.5 Grams |

Following combination, the NFDM is orange. When mixed with yogurt, the yogurt turns purple.

EXAMPLE #3

| | |
|---|---|
| Fine Granulated Sugar | 50 lbs. |
| Lecithenated oil | 3 ounces |
| WJ Color Blend CLS 24633 | 1 ounce |

Following combination, this product appears red. When mixed with yogurt, the product turns blue.

An alternate method to produce the same effect is to use the coloring factors separately:

EXAMPLE #4

Blue Sanding Sugar; prepared by mixing a solution of blue #1 dye with water, spraying onto sugar then redrying.

| | |
|---|---|
| Sanding Sugar | 100 lbs. |
| 5% Blue #1 Dye Solution | 10 ounces |
| Above blue colored sugar | 1000 Grams |
| Yellow #5 Dye | 0.5 Grams |

Following combination, this product is blue. When mixed with yogurt, the product turns green.

EXAMPLE #5

| | |
|---|---|
| Fine Granulated Sugar | 100 lbs. |
| Red #40 Lake Color (9310) | 70 grams |
| Mix together and add: | |
| Lecithin | 4 ounces |
| Add: | |
| Blue #1 Dye | 7 grams |

Following combination, this product appears red. When mixed with yogurt, the product turns blue.

Application #2, Particulates

The color-changing additive is added to particles. When these particles are used on or in a product that subsequently comes into contact with moisture, the substance with the moisture content changes color.

EXAMPLE #6

| | |
|---|---|
| Custom Industries white particle #4 size or Pearl sugars | 1000 gms |
| Mix together: | |
| Lecithenated oil | 40 gms |
| Blue #1 Dye | 2 gms |
| Panning or Mixing with particles | |

Following combination, when this product is mixed with yogurt, initially it causes blue streaks, then turns the yogurt blue.

EXAMPLE #7

Identical to example #6, except:

Oil with a specified degree of saturation is used, the oil providing increasing delays in the progression of the color change in the yogurt in correspondence to the oil's increasing degrees of saturation, and the Blue #1 Dye is replaced with Red #40 Dye.

Following combination, when this product is mixed with yogurt, initially it shows red streaks, then progressively turns the yogurt red.

EXAMPLE #8

Product from Example #6 combined with the Product from Example #7

Following combination, when this product is stirred into yogurt, initially creates blue streaks, followed by red streaks, with the end product turning purple.

Application #3, Cereals

Commercial cereal pieces were coated with an oil, then the color changing ingredients added to the outside. When the cereal is placed in milk, the milk changes color:

EXAMPLE #9

Product from Examples #1, 3 or 5 is placed on cereal. The milk turns the corresponding color.

The green pieces from "Apple Jack's" were removed. These were colored with a color altering lake/dye blend. The pieces could still appear green, or be altered in color. The altered pieces comprise about 20% of the finished cereal. Following combination of the cereal with milk, the milk turns red.

EXAMPLE #10

Cereal pieces, for example the cereal sold under the trade designation Rice Krispies sold by Kellogg, were coated with oil and then the product from example #5. After coating with the product from example #5, the cereal looks pink. Following combination of the cereal with milk, the milk turns blue.

EXAMPLE #11

| | |
|---|---|
| Custom Industries Chocolate (Cocoa) bits Size #8 | 50 lbs. |
| Lecithenated oil | 1½ lbs. |
| Yellow #6 Dye | 200 gms. |
| Coat particle with oil and then color. | |

Following combination of this product with an aqueous solution, the solution turns orange.

EXAMPLE #12

The product of example #11 can be further enhanced for use in baked goods by adding 1–5% of an oil with a higher melting temperature, in the general vicinity of 130° F., to the product in a final preparation step. The higher melting point oil prevents the release of the color during mixing of the baking ingredients. The baking will then free the color altering product from the higher melting point oil. The finished baked good will then change moisture it contacts orange.

Application #4, Cookies

When a product from examples #1,3, or 5 are placed on cookies, the cookie surface color changes when brought into contact with moisture.

EXAMPLE #13

Commercial cookies were brushed with lecithenated oil, then dusted with the color changing sugar. When this product was dunked in milk the cookie surface color changed. The product from example #1 changes the cookie surface from red to green. The product from examples #3 or 5 changes the cookie surface from red to blue.

EXAMPLE #14

Product from example 12 placed on sliced refrigerated cookie dough.

The cookies were then baked. When cooled, these cookies turn the milk orange when the cookie is dunked.

Application #5, Confectionery:

Product from examples #1, 3, or 5 could be distributed as is in, for example, small individual pouches with a dipping stick, filed straws or any filled package. Consumption of the product creates color alterations in the mouth. The product would be a combination of colors with at least one of the colors being encapsulated in a hydrophobic lipid of a determinable degree of saturation. A typical such particular degree of saturation lipid would have a melting temperature of approximately 92° F., so that the lipid encapsulation would melt when in the consumer's mouth. The color alterations of the consumer's mouth would then start as one color effect and would then change to a differing color effect as the lipid encapsulation melted.

It is apparent to anyone knowledgeable in the trade that any color combination could be used as well as any substrate. The level of the color will depend on the final application. The following representative proportions are of particular utility. Yogurt uses about 100 ppm dye to product proportions. The particles of application #2 use about 1% dye. The particles comprise about 3–5% of the finished product, which is again diluted by a factor of 10 when added to milk. Final proportions are about 30–50 ppm of dye to finished product. Generally, The final product is approximately 0.05 to 0.10% coloring factor.

In view of the above, it will be seen that the various objects and features of the invention are achieved and other advantageous results obtained. The examples contained herein are merely illustrative and are not intended in a limiting sense.

What is claimed is:

1. A color altering food product comprising:

an integrated food product initially distinct from any food material the product is to be combined with, said product having a compound composition, said product composition including a substrate and a color-altering agent, said color-altering agent adhering to the substrate and determining the product color;

said color-altering agent containing a blend of a plurality of coloring factors, said plurality of coloring factors including at least a first factor of a first color and a second factor of a second color, said blend of coloring factors controlling the agent to appear to be the first color;

wherein said food product, upon contacting a food substance with a moisture content, alters the food substance appearance in response to said moisture from an initial appearance which differs from the first and second colors to a later appearance which includes the second color.

2. The product of claim 1 wherein the alteration of said food substance appearance is by response of the second factor to said moisture.

3. The product of claim 2 wherein said second factor is a dye.

4. The product of claim 3 wherein said first factor is a dye encapsulated with a hydrophobic ingredient.

5. The product of claim 4 wherein said blend of color factors in the color-altering agent includes a substantially greater amount of the first factor than of the second factor.

6. The product of claim 1 wherein said first factor is a lake.

7. The product of claim 6 wherein said second factor is a dye.

8. The product of claim 7 wherein said blend of color factors in the color-altering agent includes an amount of the first factor substantially greater than four times the amount of the second factor.

9. The product of claim 1 wherein said food product further includes a lecithenated oil to reduce an apparent dustiness of the product.

10. The product of claim 1 wherein said food product further includes a lecithenated oil to improve dispersion in moisture.

11. The product of claim 1 wherein said second factor is a dye encapsulated by a lipid of a selectively determinable degree of saturation, said lipid encapsulation delaying the pace of response to moisture of the dye in the second factor, said delay increasing in correspondence to increasing degrees of saturation of the lipid.

12. The product of claim 11 wherein said lipid degree of saturation selectively delays the rate of response to moisture of the second factor for a determinably progressive rate of alteration of the food substance appearance by inclusion of the second color.

13. The product of claim 12 wherein said progressive alteration of the food substance appearance occurs in partial phases with altered appearance extents of the food substance intermixed with unaltered appearance extents.

14. The product of claim 1 wherein said plurality of coloring factors in the color-altering agent further includes additional factors of additional colors, at least one of said additional factors responding to contact with the moisture by altering said substance appearance to later further include the respective colors of the additional moisture responding factors.

15. The product of claim 14 wherein a plurality of said coloring factors are dyes of differing colors, each of said differing color factors being encapsulated by a lipid of a differing degree of saturation, said differing lipid saturations delaying the rate of response to moisture of their respectively encapsulated dyes by differing degrees to progressively alter the food substance appearance by varying the pace of inclusion of the differing factor colors in the food substance appearance.

16. The product of claim 1 wherein at least one of said coloring factors is a dye encapsulated by a lipid selected for a specific melting temperature, said dye response to moisture being suspended while lipid encapsulated, said dye being released from the lipid encapsulation upon exposure of the product to a temperature greater than said specific lipid melting temperature, said dye responsiveness to moisture being enabled subsequent to said greater temperature exposure by the release from lipid encapsulation.

17. The color altering food product of claim 16 produced by a process comprising the steps of:

preparing said coloring agent blend of coloring factors characterized by said color altering effect;

mixing the coloring agent with the substrate, said substrate and coloring agent having been prepared to both adhere to each other and intermix thoroughly to a uniform consistency throughout;

exposing the substrate and coloring agent combined food product to a temperature greater than the melting temperature of said encapsulating lipid and subsequently cooling down the product from said greater temperature.

18. The product of claim 16 wherein said product with lipid encapsulated dye is incorporated into a food material, preparation of said food material following incorporation of the product involving temperatures greater than said specific lipid melting temperature.

19. The food material and incorporated product of claim 18 wherein the preparation of the food material includes at least a first ingredient with a moisture content contacting said food product prior to the greater temperature exposure, said ingredient and food material appearance being unaltered by the still lipid encapsulated product dye.

20. The color altering food product of claim 1 produced by a process comprising the steps of:

preparing said coloring agent blend of coloring factors characterized by said color altering effect;

mixing the coloring agent with the substrate, said substrate and coloring agent having been prepared to both adhere to each other and intermix thoroughly to a uniform consistency throughout.

21. A color altering food product comprising:

an integrated food product initially distinct from any food material the product is to be combined with, said product having a compound composition, said product composition including a substrate and a color-altering agent, said color-altering agent adhering to the substrate and determining the product color; said color-altering agent containing a blend of a plurality of coloring factors, said plurality of coloring factors including at least a first factor of a first color and a second factor of a second color, said blend of coloring factors controlling the agent to initially appear to be the first color;

said food product appearance, upon contacting a substance with a moisture content, being subsequently altered to include the second color by action of the second factor in response to said moisture.

22. The product of claim 21 wherein said second factor is a dye.

23. The product of claim 22 wherein said first factor is a dye encapsulated with a hydrophobic ingredient.

24. The product of claim 23 wherein said blend of color factors in the color-altering agent includes a substantially greater amount of the first factor than of the second factor.

25. The product of claim 21 wherein said first factor is a lake.

26. The product of claim 25 wherein said second factor is a dye.

27. The product of claim 26 wherein said blend of color factors in the color-altering agent includes an amount of the first factor substantially greater than four times the amount of the second factor.

28. The product of claim 21 wherein said food product further includes a lecithenated oil to reduce an apparent dustiness of the product.

29. The product of claim 21 wherein said food product further includes a lecithenated oil to improve dispersion in moisture.

30. The product of claim 21 wherein said second factor is a dye encapsulated by a lipid of a selectively determinable degree of saturation, said lipid encapsulation delaying the pace of response to moisture of the dye in the second factor, said delay increasing in correspondence to increasing degrees of saturation of the lipid.

31. The product of claim 30 wherein said lipid degree of saturation selectively delays the rate of response to moisture of the second factor for a determinably progressive rate of alteration of the food product appearance by inclusion of the second color.

32. The product of claim 31 wherein said progressive alteration of the food product appearance occurs in partial phases with altered appearance extents of the food product intermixed with unaltered appearance extents.

33. The product of claim 21 wherein said plurality of coloring factors in the color-altering agent further includes additional factors of additional colors, at least one of said additional factors responding to contact with the moisture by altering said product appearance to later further include the respective colors of the additional moisture responding factors.

34. The product of claim 33 wherein a plurality of said coloring factors are dyes of differing colors, each of said differing color factors being encapsulated by a lipid of a differing degree of saturation, said differing lipid saturations delaying the rate of response to moisture of their respectively encapsulated dyes by differing degrees to progressively alter the food product appearance by varying the pace of inclusion of the differing factor colors in the food product appearance.

35. The product of claim 21 wherein at least one of said coloring factors is a dye encapsulated by a lipid selected for a specific melting temperature, said dye response to moisture being suspended while lipid encapsulated, said dye being released from the lipid encapsulation upon exposure of the product to a temperature greater than said specific lipid melting temperature, said dye responsiveness to moisture being enabled subsequent to said greater temperature exposure by the release from lipid encapsulation.

36. The product of claim 21 wherein said product with lipid encapsulated dye is incorporated into a food material, preparation of said food material following incorporation of the product involving temperatures greater than said specific lipid melting temperature.

37. The food material and incorporated product of claim 36 wherein the preparation of the food material includes at least a first ingredient with a moisture content contacting said food product prior to the greater temperature exposure, said ingredient and food material appearance being unaltered by the still lipid encapsulated product dye.

38. The color altering food product of claim 21 produced by a process comprising the steps of:
preparing said coloring agent blend of coloring factors characterized by said color altering effect;
mixing the coloring agent with the substrate, said substrate and coloring agent having been prepared to both adhere to each other and intermix thoroughly to a uniform consistency throughout.

39. A color altering food product comprising:
an integrated food product initially distinct from any food material the product is to be combined with, said product having a compound composition, said product composition including a substrate and a plurality of color-altering agents, said color-altering agents adhering to the substrate and each other and collectively determining the product color;
said color-altering agents containing a plurality of coloring factors, said plurality of coloring factors including at least a first factor of a first color and a second factor of a second color, said plurality of coloring factors combining to control the agent to appear to be the first color;
wherein said food product, upon contacting a food substance with a moisture content, alters the food substance appearance in response to said moisture from an initial appearance which differs from the first and second colors to a later appearance which includes the second color.

40. The product of claim 39 wherein the alteration of said food substance appearance is by response of the second factor to said moisture.

41. The product of claim 39 wherein said second factor is a dye.

42. The product of claim 41 wherein said first factor is a dye encapsulated with a hydrophobic ingredient.

43. The product of claim 42 wherein said color factors include a substantially greater amount of the first factor than of the second factor.

44. The product of claim 39 wherein said first factor is a lake.

45. The product of claim 44 wherein said second factor is a dye.

46. The product of claim 45 wherein said color factors include an amount of the first factor substantially greater than four times the amount of the second factor.

47. The product of claim 39 wherein said food product further includes a lecithenated oil to reduce an apparent dustiness of the product.

48. The product of claim 39 wherein said food product further includes a lecithenated oil to improve dispersion in moisture.

49. The product of claim 39 wherein said second factor is a dye encapsulated by a lipid of a selectively determinable degree of saturation, said lipid encapsulation delaying the pace of response to moisture of the dye in the second factor, said delay increasing in correspondence to increasing degrees of saturation of the lipid.

50. The product of claim 49 wherein said lipid degree of saturation selectively delays the rate of response to moisture of the second factor for a determinably progressive rate of alteration of the food substance appearance by inclusion of the second color.

51. The product of claim 50 wherein said progressive alteration of the food substance appearance occurs in partial phases with altered appearance extents of the food substance intermixed with unaltered appearance extents.

52. The product of claim 39 wherein said plurality of coloring factors further includes additional factors of additional colors, at least one of said additional factors responding to contact with the moisture by altering said substance appearance to later further include the respective colors of the additional moisture responding factors.

53. The product of claim 52 wherein a plurality of said coloring factors are dyes of differing colors, each of said differing color factor dyes being encapsulated by a lipid of a differing degree of saturation, said differing lipid degrees of saturation delaying the rate of response to moisture of their respectively encapsulated dyes by differing degrees to progressively alter the food substance appearance by varying the pace of inclusion of the differing factor colors in the food substance appearance.

54. The product of claim 39 wherein at least one of said coloring factors is a dye encapsulated by a lipid selected for a specific melting temperature, said dye response to moisture being suspended while lipid encapsulated, said dye being released from the lipid encapsulation upon exposure of the product to a temperature greater than said specific lipid melting temperature, said dye responsiveness to moisture being enabled subsequent to said greater temperature exposure by the release from lipid encapsulation.

55. The color altering food product of claim 39 produced by a process comprising the steps of:
mixing the substrate and a lipid until the substrate is well coated with the lipid;
mixing in the first coloring factor with the lipid-coated substrate until said first factor coats the substrate by adhering to the lipid;
mixing in additional lipid until the first factor coated substrate is overcoated with the lipid; mixing in the second coloring factor with the lipid overcoated first factor coated substrate until said second factor outermostly coats the substrate and first factor by adhering to the lipid overcoat.

56. The product of claim 39 wherein said product with lipid encapsulated dye is incorporated into a food material, preparation of said food material following incorporation of the product involving temperatures greater than said specific lipid melting temperature.

57. The food material and incorporated product of claim 56 wherein the preparation of the food material includes at least a first ingredient with a moisture content contacting said food product prior to the greater temperature exposure, said ingredient and food material appearance being unaltered by the still lipid encapsulated product dye.

58. A color altering food product comprising:
an integrated food product initially distinct from any food material the product is to be combined with, said product having a compound composition, said product composition including a substrate and a color-altering agent, said color-altering agent adhering to the substrate and determining the product color;
said color-altering agent containing a blend of a plurality of coloring factors, said plurality of coloring factors including at least a first factor of a first color and a second factor of a second color, said blend of coloring factors controlling the agent appearance to be the first color;
wherein said food product, upon contacting a food substance with a moisture content, alters the food substance appearance in response to said moisture from an initial appearance which differs from the first and second colors to a later appearance which includes the first color, and said blend of coloring factors in the agent alters in response to said moisture to subsequently control the product appearance to be the second color.

59. The color altering food product of claim 58 produced by a process comprising the steps of:

preparing said coloring agent blend of coloring factors characterized by said color altering effect;

mixing the coloring agent with the substrate, said substrate and coloring agent having been prepared to both adhere to each other and intermix thoroughly to a uniform consistency throughout.

60. A method of altering the appearance of a food substance comprising the steps of:

blending a plurality of coloring factors into a coloring agent initially distinct from any food material the agent is to be combined with, said coloring agent including at least a first factor of a first color and a second factor of a second color;

constituting the first factor to be unresponsive to moisture and constituting the second factor to be responsive to moisture, said second factor responding to contact with a food substance having a moisture content by providing the second color to the food substance;

combining said coloring agent with a substrate into a composite food product and controlling said food product composition appearance to be said first color; and altering the appearance of the food substance having a moisture content from an initial appearance which differs from the first and second colors to a later appearance which includes the second color by contacting said food substance with the food product.

61. A method of altering the appearance of a food substance comprising the steps of:

blending a plurality of coloring factors into a coloring agent initially distinct from any food material the agent is to be combined with, said coloring agent including at least a first factor of a first color and a second factor of a second color;

constituting the first factor to be unresponsive to moisture and constituting the second factor to be responsive to moisture, said second factor responding to the moisture by providing the second color to the source of the moisture;

combining said coloring agent with a substrate into a composite food product and controlling said food product composition appearance to be said second color; and altering the appearance of a food substance which has a moisture content from an initial appearance which differs from the first and second colors to a later appearance which includes the second color by contacting said food substance with the product, said contact with moisture further altering said coloring agent to subsequently control the food product composition appearance to be said first color.

* * * * *